United States Patent
Pulford et al.

(10) Patent No.: US 6,393,608 B1
(45) Date of Patent: May 28, 2002

(54) SELF-POWERED MODIFICATION KIT FOR HID LUMINAIRE INSTALLATIONS

(76) Inventors: William Miles Pulford, 2 Wythe Ct., Glenarm, MD (US) 21057; Donald Stephen Moore, 8873 Stonebrooke La., Columbia, MD (US) 21046

( * ) Notice: Subject to any disclaimer, the term of this patent is extended or adjusted under 35 U.S.C. 154(b) by 0 days.

(21) Appl. No.: 09/713,853

(22) Filed: Nov. 16, 2000

(51) Int. Cl.[7] .............................................. H02M 3/335
(52) U.S. Cl. ...................................... 1/16; 315/DIG. 4
(58) Field of Search .............................. 363/15, 16, 95, 363/97, 131; 315/267, 276, 291, 306, DIG. 4

(56) References Cited

U.S. PATENT DOCUMENTS

| | | | |
|---|---|---|---|
| 4,675,579 A | * | 6/1987 | Hardy et al. ................. 315/318 |
| 4,772,824 A | * | 9/1988 | Gulledge ...................... 315/291 |
| 4,931,701 A | | 6/1990 | Carl |
| 4,994,718 A | | 2/1991 | Gordin |
| 5,216,333 A | * | 6/1993 | Nuckolls et al. ............. 315/291 |
| 5,327,048 A | | 7/1994 | Troy |
| 5,451,843 A | | 9/1995 | Kahn et al. |
| 5,815,067 A | | 9/1998 | Knoble et al. |

\* cited by examiner

*Primary Examiner*—Matthew Nguyen

(57) ABSTRACT

A lamp dimming system, designed to be added to existing HID fixtures with an absolute minimum of installation time and no external wiring is disclosed. Any existing ballast may be converted to a bi-level device for intelligent energy savings. The modification kit is wired in series with one of the lamp leads to effect both powering of the unit and control of the lamp. All timing and control is on an individual lamp basis so that the lamp temperature stabilization is completed before dimming is attempted. No external wiring, either to power the control unit or to effect control of the lamp dimming is required. Several versions are described. In one version the unit senses an occupant and stops dimming both of itself and other lamps in a network. In another version the unit receives a radio command to dim or brighten, which is inhibited until the initial power up delay sequence is completed. Self powered versions of both receiver and transmitter implementations are included.

4 Claims, 7 Drawing Sheets

SELF-POWERED MODIFICATION KIT FOR HID LUMINAIRE INSTALLATIONS

BACKGROUND OF THE INVENTION

The present invention relates to a power saving controller designed to be added to any HID fixture with an absolute minimum of wiring. In particular, it eliminates a separate supply to power the control circuits by extracting current from the lamp being controlled.

All prior art incorporated means for reducing the applied voltage or limiting the current through a "lossless" mechanism. The difference in this case is how the lossless device is incorporated and how it is powered and controlled.

Assuming a HID lamp there are two general categories of such dimmers. They are: (1) Reduce the applied primary input power by: (a) Step down transformer (conventional or autotransformer), (b) Insert a lossless reactance to drop the voltage without attendant dissipation, (c) Limit the applied energy by a solid state switch, which does not continuously conduct. (Switching power supply).

Secondly, many inventors and manufacturers have concentrated on making or modifying a fixture, which has dimmable capabilities. These have followed similar approaches: (a) Step down transformer, (b) Adding a "lossless" reactance, (c) Duty cycle switching.

Since each of these features have some intelligence, they require a power supply for the control logic. These power supplies are usually connected to the primary supply with its attendant problems. Powering from a variety of sources increases manufacturing and installation costs because of the wide variety of commercial power supply voltages.

Any modifications or connection to the primary supply is quite complicated because of the wide variety of voltages available. Moving the control power supply physically inside the ballast doesn't eliminate the complexities associated with such a variety of supply voltages.

BRIEF SUMMARY OF THE INVENTION

Power reduction in HID lamps is currently achieved by reducing the lamp current by reducing the capacitance of the series capacitor. In the majority of installations this is achieved by employing two capacitors whose sum is equal to the value required for maximum brightness. Dimming is achieved by switching out one these capacitors leaving only the desired low value.

The object of this invention is to absolutely minimize the installation labor and costs so that the modification investment may be recovered as quickly as possible. Toward this end the installed ballast is left intact and the lamp series capacitor value is reduced by adding another capacitor externally. The internal capacitor is left unchanged. To return to full brightness the external capacitor is shorted.

Dimming the lamp is only one aspect of the changes required. To be effective the dimming must be intelligent and provide normal light levels when required. It must also be intelligent enough to dim the lights when the area is unoccupied. Control implies electronics, which in turn implies power for operation. Inside the ballast enclosure mains power is available but this comes in a wide range of voltages, 120 to 408VAC, which complicates their use in a modification kit. None of these are available at the lamp. The voltage across the lamp, and the current through it varies widely during warm-up and run.

The invention describes a current transformer in series with the lamp, which is able to derive power for the control electronics during the entire lamp operational cycle. Timing is provided from lamp turn-on To insure that the lamp reaches a stable operating temperature before dimming is enabled.

Sufficient power is obtained from the series transformer to also power the associated sensors mounted externally and the internal RF transmitter or receiver, mounted within the SPMK enclosure.

Sensors are relatively expensive, so it is advantageous to minimize the number required for a complete building modification. Toward this end the SPMK incorporates a coded RF transmitter to allow a single sensor to control the dimming of groups of lamps. This is accomplished through companion SPMK units equipped with RF receivers. Through the use of addressing and coding a single lamp may be controlled by more than one SPMK transmitters.

The receiver version of the SPMK allows the use of a variety of controlling sources in addition to the SPMK transmitter. Hand-held, wall-mounted sensors, vehicle-mounted, transmitters etc. all may be employed in any mixture.

All of this power saving capability is achieved by modifying only one of the two wires exiting the ballast to the HID lamp. Any lamp in the range of 175 to 1000 watts may be controlled. The SPMK electronics including a receiver or transmitter and antenna is mounted in the SPMK enclosure. The sensor is either mounted on the SPMK enclosure or on the luminaire itself.

DETAILED DESCRIPTION OF THE INVENTION

The invention, described herein, is a Self-Powered Modification Kit (SPMK) intended for use with HID* luminaire installations to provide a dimming (low-power) capability.
*(In this context, "HID" refers to mercury vapor, metal halide and high-pressure Sodium lamps.)

Figure 1:
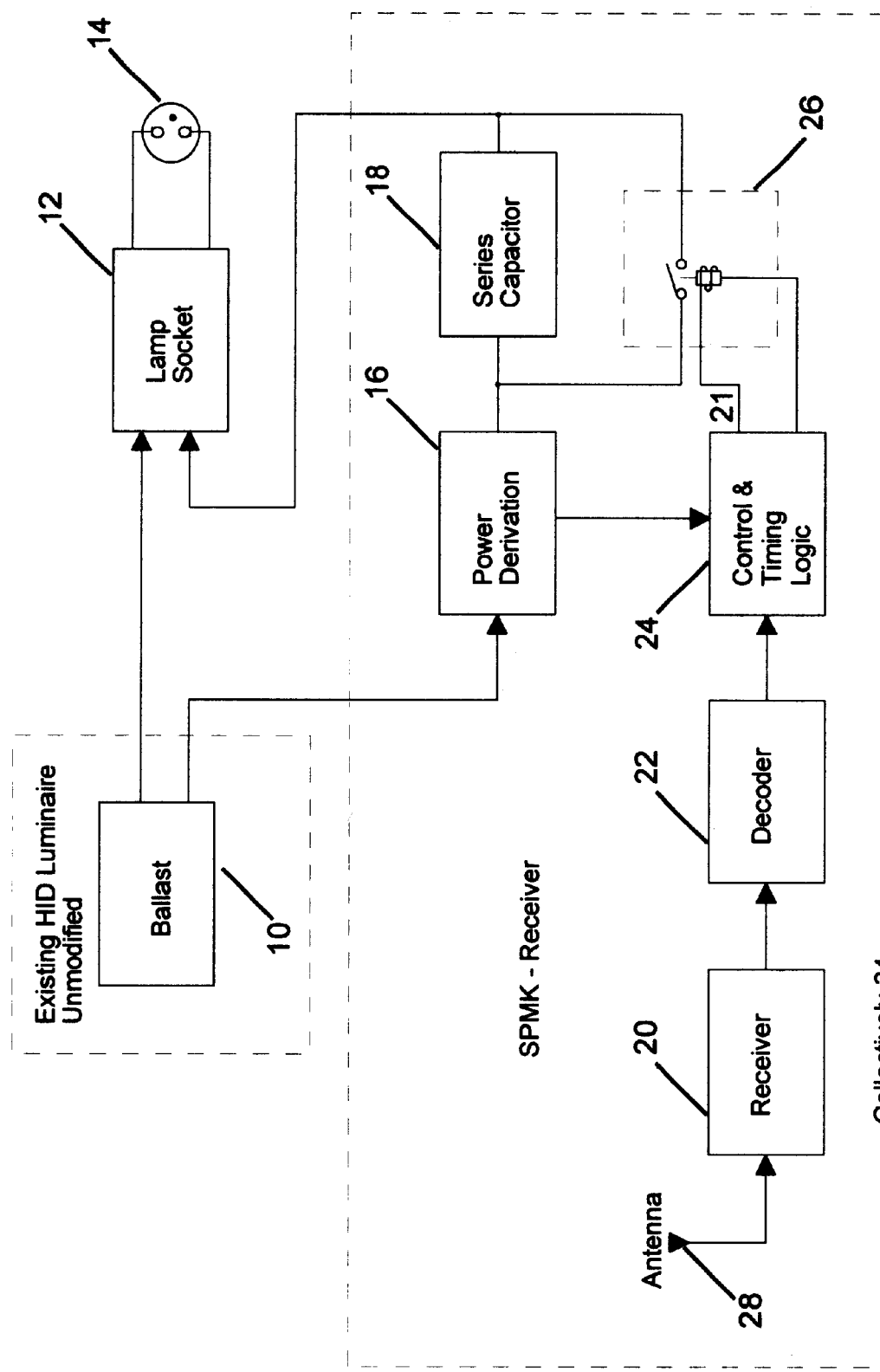
FIG. 1 is a block diagram showing key areas of the invention incorporated in the receiver version.

As depicted in FIG. 1, the invention derives its' power 16 from the current supplied to the lamp 14. It is installed by connecting the SPMK in series with one of the wires to the lamp socket 12 connected to the existing ballast 10. Ballast as used herein is assumed to be the electric portion of a commercial luminaire and contains a voltage transformer means, a series inductor, a series capacitor and may contain a pulse-starting circuit. This powering arrangement of the SPMK is counterintuitive since the power source for the SPMK is derived from the load being controlled, which, in turn, goes through extremely large current variations during warm-up, normal running, and during the actual dimming.

In the undimmed (non-power saving) mode the non-polarized capacitor 18 is shorted by the relay 26 (shown as a mechanical type, may also be a solid state type) and to allow the lamp to operate normally. However, solid-state relays require power to close, which requires power to the SPMK at turn-on. To effect dimming relay 26 is opened, which places the capacitor in series with the lamp to reduce the lamp current.

Timing (accomplished in 24), from the application of power, is incorporated to allow the lamp to reach a stable operating temperature, nominally 15 minutes, before dimming is enabled.

In keeping with the goal of requiring minimum (zero) new wiring to implement the modification, installation of the preferred embodiment of the invention utilizes a RF receiver 20, with associated antenna 28, and decoder 22 to select and interpret transmitted control signals.

Figure 2:
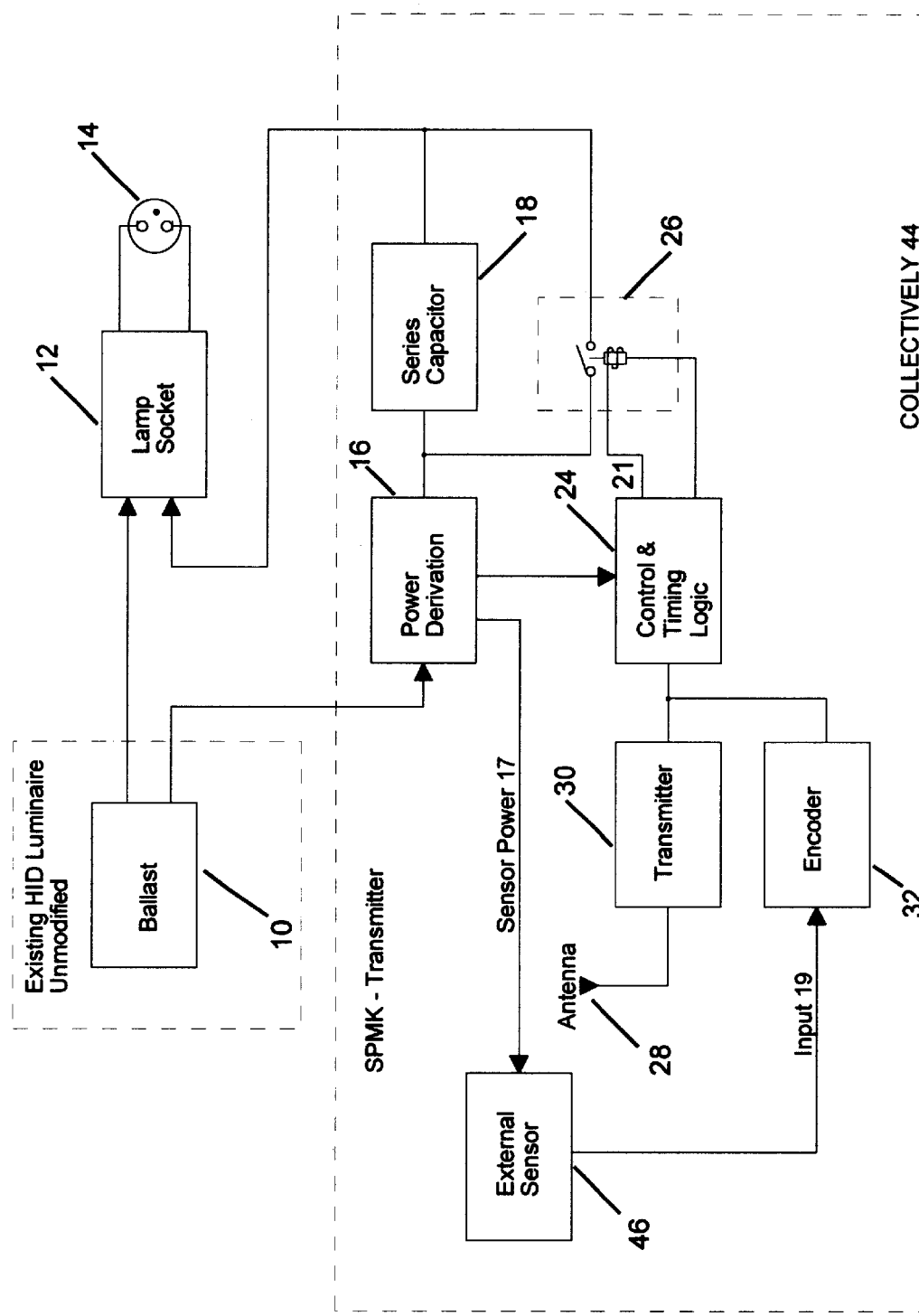
FIG. 2 is a block diagram showing key areas of the invention as incorporated in the transmitter version.

Most probably the command to dim will come from a second embodiment of the invention, shown in FIG. 2, which employs a coded transmitter in addition to the power derivation and timing circuitry. This transmitter is triggered by the output 19 of a motion detector or other sensor 46.

FIG. 2 is a block diagram of this transmitter version of the basic embodiment. It still derives its' power 16 from the lamp and is designed to power 17 an associated sensor 46 to determine the need for the maximum brightness mode.

In this embodiment of the block diagram, a transmitter module 30 replaces the receiver 20 and an encoder 32 replaces the decoder 22. All power derivation 16, timing and local control functions 24 remain unchanged. In response to the external sensor input 19, the local lamp is dimmed or brightened and this status is transmitted to receiver version of the invention set to the proper code.

Figure 3:
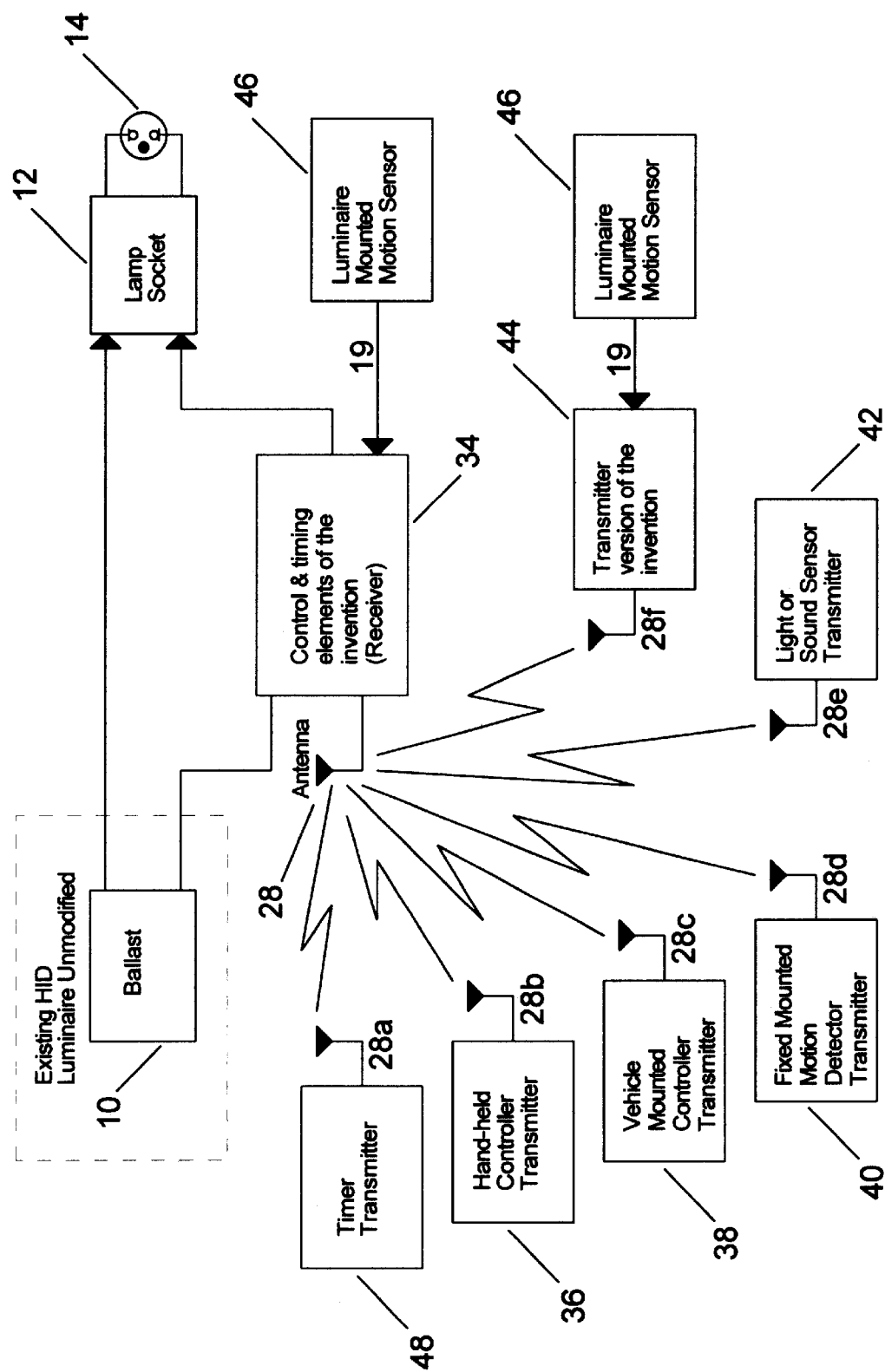
FIG. 3 is a system block diagram showing the adaptability to a variety of controlling sources.

FIG. 3 enlarges on this aspect of remote control via a coded RF link. The command to dim or brighten may come from a variety of encoded transmitters, i.e.:

Transmitter version of the invention, 44.

Motion detectors, 40, 46.

Ambient Light or Sound Sensors, 42.

Vehicle Mounted (forklift, tow motor), 38.

Handheld; includes "all call" for test 36.

The remaining FIGS: 4, 5, 6 & 7 provide circuit details of the preferred embodiment of the invention.

Figure 4:
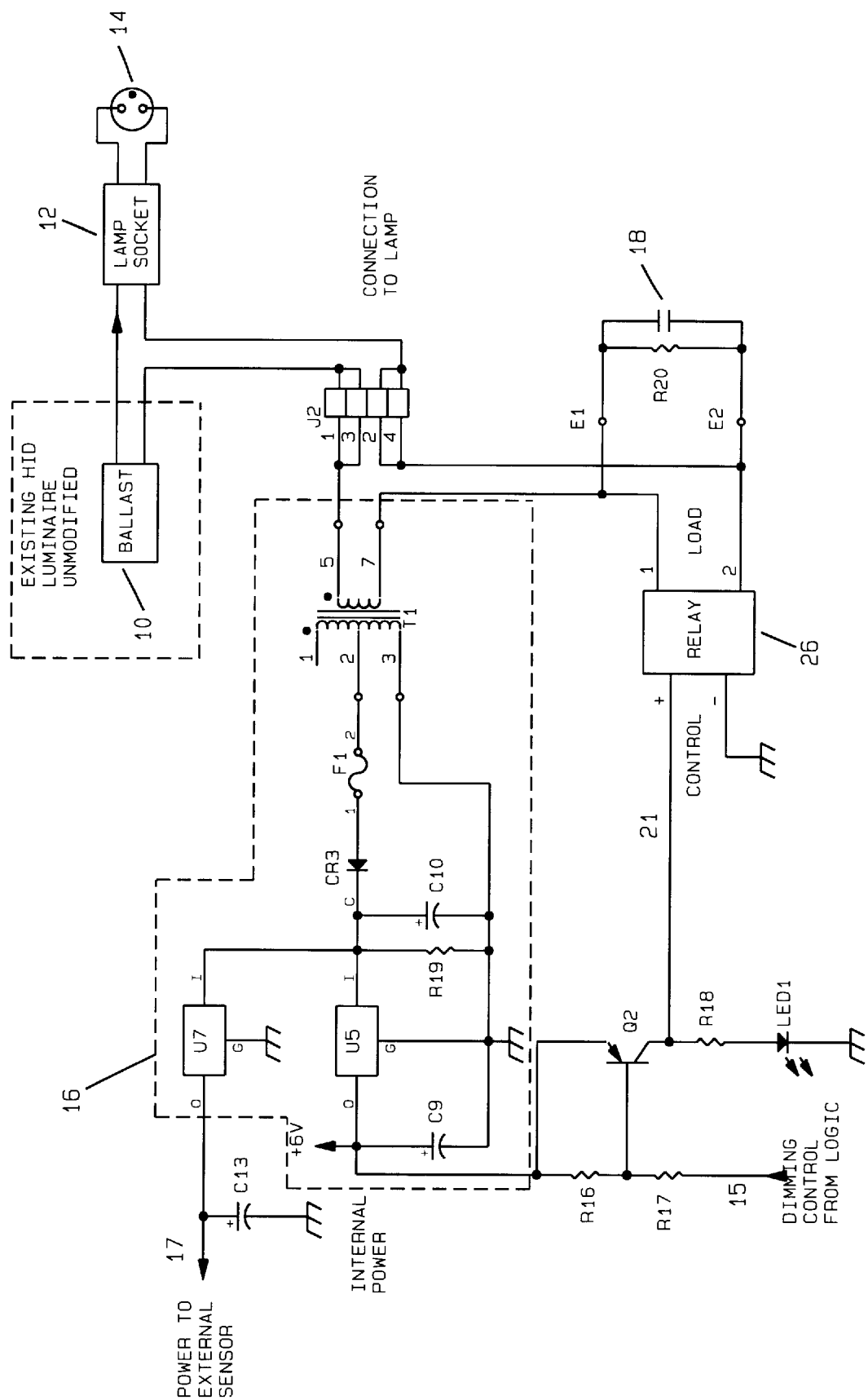
FIG. 4 is a schematic of the power derivation and HID lamp current control circuits.

The modification of conventional luminaire ballast 10 is shown in FIG. 4. To install the SPMK, one of the leads, exiting the ballast, to the lamp socket 12 is disconnected and routed to, and returned from, the SPMK unit via a two-conductor cable and connector J2. In effect the primary of T1 and the contacts of relay 26 (when closed) form a series circuit connecting the HID lamp wire to the ballast. Thus, when the lamp is undimmed, the ballast and lamp operate normally except for the small amount of impedance added by the primary of T1. When relay 26 is opened, in response to a dimming command, the lamp current flows through the primary of T1, and through the series capacitor 18, to reduce the lamp current and thus implement the desired power savings and dimming.

In low power lamp embodiments, conventional mechanical relays 26 have been employed to effectively shunt the series capacitor. For high power versions it has been found necessary to employ solid-state, zero-crossing relays to achieve relay life.

T1 is a current transformer actually used to derive power. It differs from conventional current transformers which are usually instrumentation devices providing a calibrated output voltage. In this application the actual voltage is not critical so long as it does not exceed the regulators (U7, U5) maximum rated input voltage and does not drop below the minimum, saturation, voltage of the regulators.

The rectified DC output voltage from T1, CR3, C10 is variable depending on the lamp wattage (current) and where the lamp is operating in its' start up and/or dimming sequence. In addition to selection of a secondary tap on T1, a loading resistor R19 is utilized to control the DC output to be within the limits described above. The rectified DC voltage developed by CR3 and appearing at C10 is applied to two regulators U7 and U5. U7 provides a voltage to power external sensors. U5 provides a relatively low voltage (+6V) to power the logic, control and receiver or transmitter circuits.

When maximum brightness is required, the control logic pulls R17 low turning on Q2, a PNP transistor, which drives both the capacitor shorting relay 26, and LED 1 indicating the dimming status. All of the circuitry described herein except capacitor 18 and R20 is mounted on a single PC board for convenience. The high voltage capacitor 18 is discharged by R20 for safety.

Figure 5:
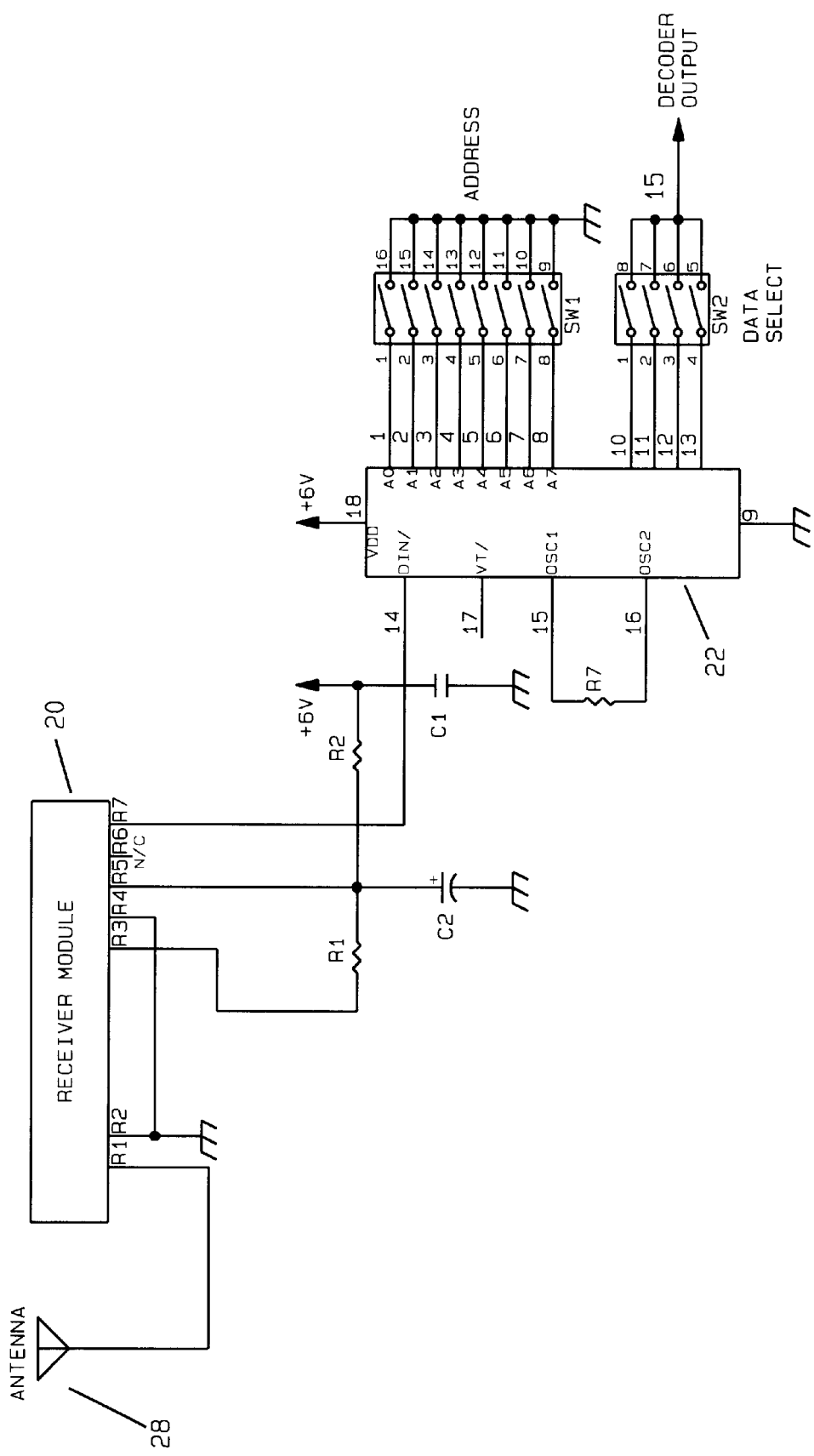
FIG. 5 is a schematic of the receiver/decoder.

FIG.5 describes the receiver/decoder portion of the SPMK controller. Signals are received by the internal antenna 28 and coupled to the UHF receiver 20 RF input. Any convenient frequency may be employed, but the preferred embodiment employs UHF.

The receiver is a conventional superhetrodyne type and is depicted as a block since it is implemented with a commercially available receiver module. Both FM and AM receivers are utilized depending on the desired range and RF environment of the application.

The receiver module 20 provides all of RF gain, selectivity, demodulation and waveform reshaping so that it's squared output represents noise, signal, or both.

The reshaped output from the receiver 20 is applied directly to a decoder IC, 22 which matches the address portion of the received digital word to the address as set on the 8 DIP-switches of SW1. The decoder IC has an internal oscillator, which provides timing, pulse-width discrimination and counting of valid received messages.

When a valid message is received the final four bits of the transmitted code are latched in the four positions which, in conjunction with SW2, provide "decoder output" 15. SW2 allows selection of the data code bits to be utilized as a means of configuring signaling nets. For example, two nets may have the first 8 code (address) bits set identically but communicate on a non-interfering basis if one employs bit 9 and the other bit 10. A third transmitter could transmit both bits (9 & 10) to control both nets simultaneously.

Figure 6:
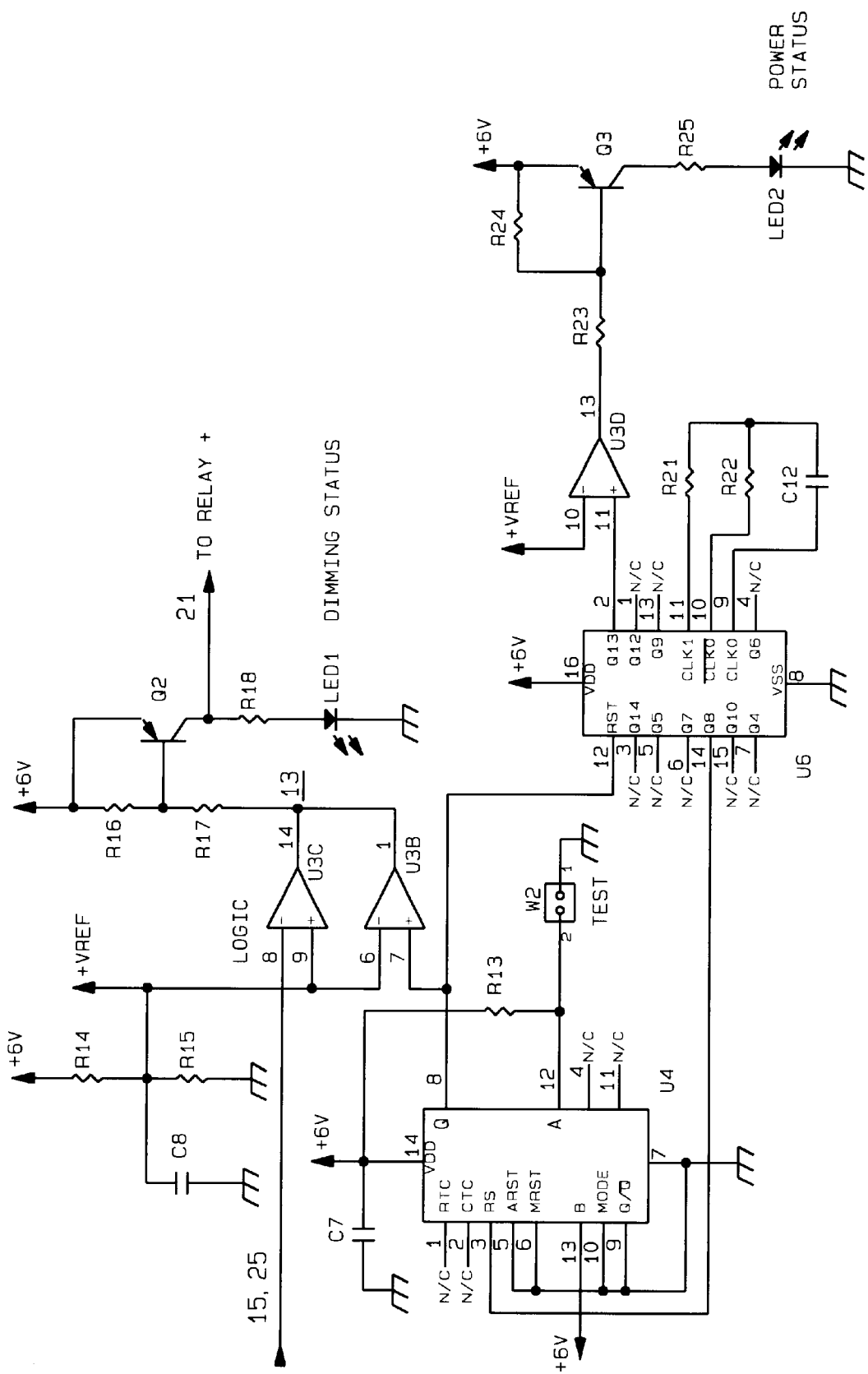
FIG. 6 is a schematic of the timer and LED drivers.

FIG. 6 depicts the timing and control portions of the Decoder portion of the invention.

All timing is derived from U6, a 14-Stage Ripple-Carry Binary Counter/Divider and Oscillator. Selecting R21, R22 and C12 sets its basic oscillation frequency.

One of the divided outputs, Q8, is used to clock another Programmable Divider IC, U4. These two dividers differ in their logical function. The U6 oscillator divider runs continuously and its' division ratio is selected by selecting one of the Q outputs. On the other hand, U4 resets to a zero count at turn-on and it runs until a preset count or division is achieved. At that time it latches to effect a timer function. The division ratio of U4 is set to a low value for test purposes by grounding the logic control pin (A) through a test jumper W2. For the operational 15-minute timing this pin returned to +V by the R13 pull-up.

After the initial warm up or test interval, U4s' Q output holds the oscillator-divider in reset (low) to release the lock on the relay control U3B, U3C. As long as comparator U3B open collector output is pulled low, the action of comparator U3C is overridden. Pulling R17 low turns on the PNP transistor Q2 that turns on the power status LED 1 and controls the capacitor-shorting relay 26. In operation, the timing is set to cause U3B to turn on the relay 26 for a nominal 15-minute period to effect an initial warm-up of the lamp. After this initial period U3B releases its override and allows U3C to respond to commands received from the decoder described previously.

One of the low frequency taps of the U6 divider is used to drive another comparator U3D. As it toggles above and below the reference voltage Vref. it blinks a second LED (LED2) to indicate that power is applied and that the unit is in its warm-up sequence. At the end of the 15-minute period, when U6 is reset, the toggling is stopped and the LED goes to steady illumination.

Figure 7:
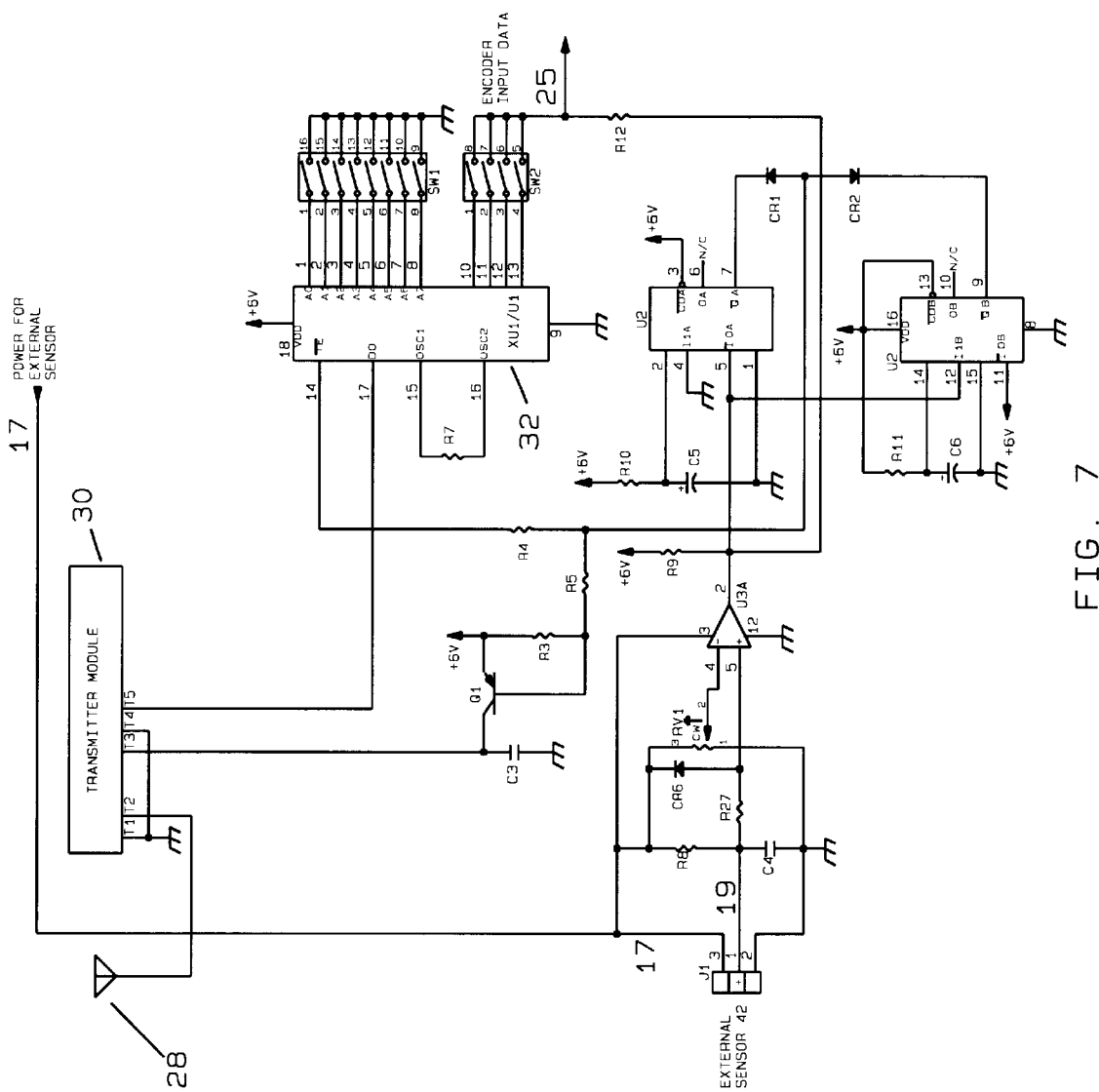
FIG. 7 is a schematic of the remote sensor interface and encoder/transmitter.

FIG. 7 is a detailed schematic of the unique portion of the invention configured as a transmitter/encoder, and describes the blocks marked "Transmitter" 30 and "Encoder" 32 in FIG. 2. The basic power derivation, delay timing and lamp dimming circuits are identical.

Referring again to FIG. 7, the power derived from the lamp current is supplied to an external sensor 17 (assumed to be a motion detector). When no motion is detected the voltage at pin 1 on J1 drops to a low quiescent value. This drop is sensed by the comparator U3A that causes the voltage at the comparator output to drop. Conversely when motion is detected the voltage at pin 1 rises. The threshold voltage for sensing "high" or "low" is set by RV1.

The output of U3A is coupled to a Dual Precision Monostable Multivibrator (Retriggerable, Resettable), U2. One section is configured to initiate a time interval on a rising waveform. The other section is configured to trigger on a falling waveform. Thus a change of state will trigger a transmission. The actual time of each, as set by R10-C5, and R11-C6, is set to be less than a second to limit the transmitter ON time. In either case the Q outputs will be triggered causing either CR1 or CR2 to conduct for a nominal one-second interval.

The conduction of CR1 or CR2 causes R5 to pull the base of the PNP transistor Q1 to ground turning it ON. This enables the transmitter 30 to transmit.

The actual state of the sensor is outputted from comparator U3A to appear as a data input of the encoder 32. The position of this data in the encoder output word is selected by SW2 and it can be transmitted in one or all of the uncommitted bit positions.

The encoder 32 is a companion to the decoder 22 described previously. It too has an internal RC oscillator whose frequency is set by R7. As before, the basic 8-bit address is set by SW1.

The encoder 32 data output DO (data out) directly modulates the transmitter 30. This same information 25 is also utilized for local control.

The proceeding described the action of the timing and control functions in terms of being implemented with discrete ICs. All of these functions may readily be implemented with a single-chip microcomputer.

If a control function is available from another source, the power derivation, control and dimming functions can be operated directly without the RF components.

We claim:

1. An intelligent High Intensity Discharge (HID) lamp dimming system which obtains its internal electrical supply power and power to operate external sensors directly from the current supplied to the controlled HID lamp comprising:

a. a power extraction circuit having a current operated power transformer incorporated within the unit whose primary is effectively connected in series with one of the HID lamp supply leads without access to the interior of the HID lamp ballast. The isolated, low voltage from the transformer secondary is sufficient to power the internal circuitry of the control device as well as provide external sensor power even during HID lamp start-up and dimming periods.

b. a series, reactive component when inserted by said electronic control device, causes a reduction of input power to high intensity discharge lamp and concurrently reduces said lamp lumen output.

c. a means for controlling the insertion of said series, reactive component when predetermined conditions have developed thereby reducing the input power to High Intensity Discharge lamp, resulting in an electrical energy saving.

2. The electronic control device of claim 1 is contained in an independent enclosure and may be mounted by various means sufficiently close to interface and connect to either wire between high intensity discharge lamp ballast and the high intensity discharge lamp, whereby eliminating the necessity of obtaining accessibility to the exterior or interior of ballast compartment to obtain the aforementioned results and whereby substantially reducing installation costs.

3. The means for control of claim 1 whereas the individual electronic control device provides for stabilization of arc tube temperature of the high intensity discharge lamp and enables said means for control to process internal and external signals form multiple input control devices, whereby eliminating the necessity of external wiring and/or connections.

4. The means for control of claim 1 wherein provides for capability of one apparatus utilizing a transmitter with an encoder for said means for control, wherein controlling one or multiple apparatus or groups apparatus utilizing a receiver with a decoder for said means for control, whereby eliminating the need for apparatus control wiring, therefor substantially reducing installation, maintenance, and reconfiguration costs of said multi-level high intensity discharge lamp controls apparatus.

\* \* \* \* \*